Oct. 28, 1969  D. G. NOILES  3,474,747
APPARATUS FOR MANIPULATING A WORKPIECE ALONG AN
IRREGULAR CONTOURED PATH THROUGH A WORKSTATION
Filed Aug. 24, 1967  5 Sheets-Sheet 3

INVENTOR
DOUGLAS G. NOILES
BY
Kenneth E. Merkler
ATTORNEY

Oct. 28, 1969  D. G. NOILES  3,474,747
APPARATUS FOR MANIPULATING A WORKPIECE ALONG AN
IRREGULAR CONTOURED PATH THROUGH A WORKSTATION
Filed Aug. 24, 1967  5 Sheets-Sheet 4

INVENTOR
DOUGLAS G. NOILES
BY Kenneth E. Merklen
ATTORNEY

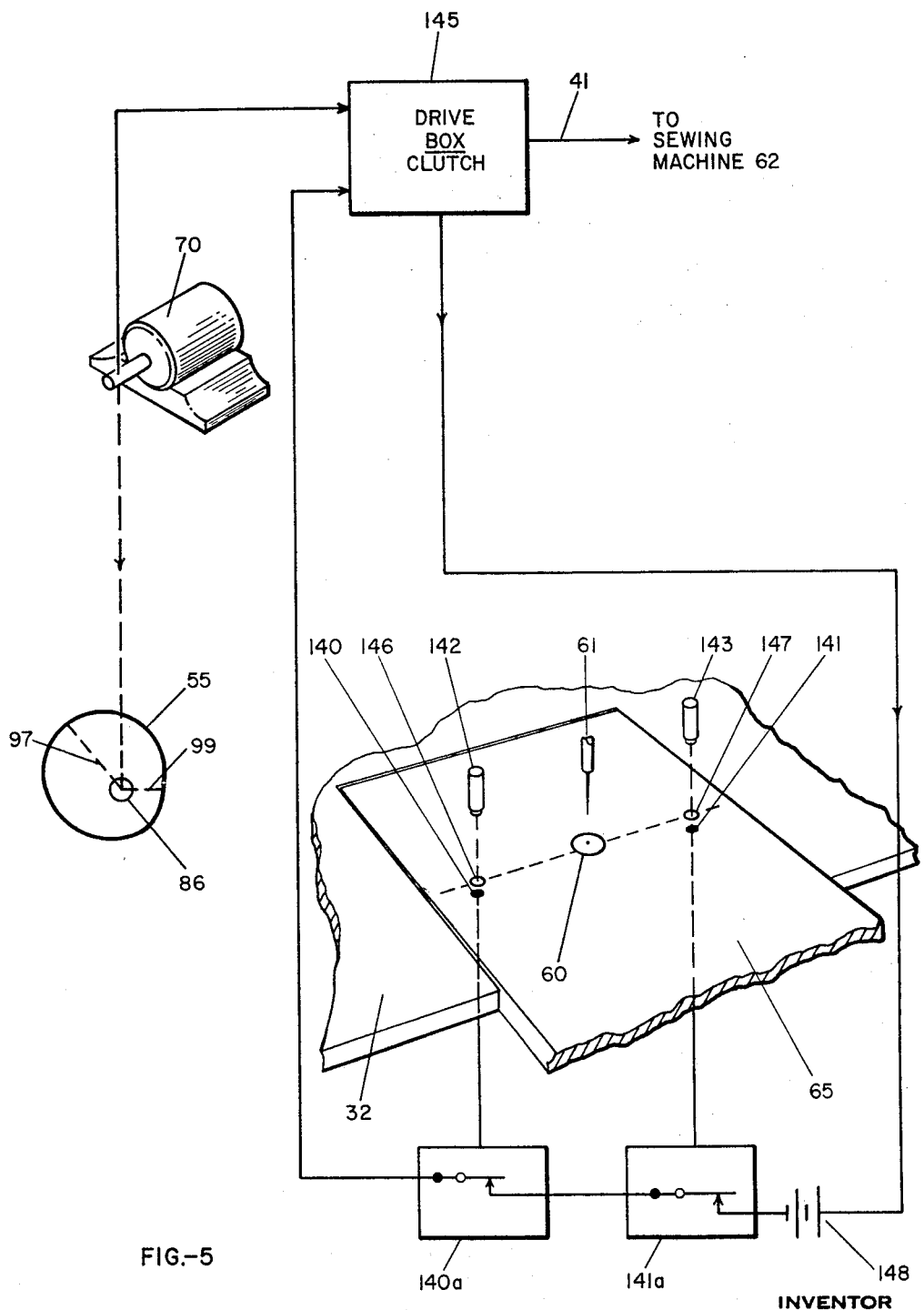

United States Patent Office 3,474,747
Patented Oct. 28, 1969

3,474,747
APPARATUS FOR MANIPULATING A WORKPIECE ALONG AN IRREGULAR CONTOURED PATH THROUGH A WORKSTATION
Douglas G. Noiles, New Canaan, Conn., assignor, by mesne assignments, to Ivanhoe Research Corporation, New York, N.Y., a corporation of Delaware
Filed Aug. 24, 1967, Ser. No. 663,033
Int. Cl. D05b 23/00
U.S. Cl. 112—2        14 Claims

ABSTRACT OF THE DISCLOSURE

Apparatus for manipulating workpiece on a worksurface for guiding the workpiece through a workstation for presentation to a workpoint so that a predetermined irregular contour path along or across such workpiece passes through the workstation and the rate at which each point on the path is passed through the workpoint is proportioned to the rate at which work is done at such workpoint. Each point in sequence along the predetermined path is presented to the workpoint in a desired angular relationship. Such apparatus is described operating in a coordinated system in which workpiece transfer devices are coordinated with the manipulating apparatus and as an independent apparatus, with provision for workpiece position control of the work done at the workstation.

REFERENCES

Co-pending application, Ser. No. 475,986, "Methods and Apparatus for Automatically Transferring and Registering Fabric Workpieces and for Combining Them," by George F. Hawley and John H. Buettner, filed July 30, 1965, and assigned to the same assignee as the present application. Co-pending application, Ser. No. 619,302, "Methods and Apparatus for Automatically Registering and Combining Fabric Workpieces," by Herman Rovin and Fred J. Schiffmacher, filed Feb. 28, 1967, and assigned to the same assignee as the present application.

DISCLOSURE

The present invention relates to apparatus for automatically controlling and propelling workpieces through a workstation for performing work thereon. In particular, the apparatus of the present invention may be referred to as workpiece manipulation apparatus and is particularly useful in driving limp material workpieces past or through a workpoint or workstation where the track or path along or across the workpiece which passes through the workpoint or workstation is irregular in contour and the workpiece passes through the workpoint or workstation at a rate or speed which is proportional to the rate at which such work is performed at such workstation and each point in sequence along the predetermined path is presented to the workpoint in a desired angular relationship.

The present invention is particularly useful in guiding or manipulating limp material workpieces, such as fabric, for example, through or along irregular contoured paths through a sewing station.

The garment and/or apparel manufacturing industry is characterized by large volume use of manual labor. This stems from the fact that manipulation of fabric workpieces or fabric panels through a sewing station is normally a function of art or skill as opposed to the science of the sewing function per se.

The guiding of limp material workpieces along a substantially straight line or path may require relatively little art or skill. However, when the path or track followed is irregular in contour, the more severe the irregularity of the contour the higher the degree of art or skill involved in manipulating or guiding the workpiece along such path or track.

A specific example of manipulation which may require a relatively large amount of skill is the stitching of a curved path of decorative stitches across the fact of a panel, with the curved path of stitch decoration exactly duplicated on a plurality of similar panels. Such duplication of the contoured decorative stitching in successive panels may be exactly accomplished by the manipulating apparatus of this invention.

Another example of manipulation or guiding which may require a relatively large amount of skill is the serging of the edge of a panel where the panel edge deviates from a straight line edge and the deviation is nonlinear. This is another function in which the present workpiece manipulation apparatus may be successfully employed, i.e. guiding the irregular contoured edge of such workpiece through the workstation of a serger for serging such edge, or for any other class of stitch formation along such edge.

Workpiece manipulating devices have been proposed but such prior devices have various severe operational shortcomings and limitations and are not capable of manipulating a workpiece through irregular contoured paths which include reverse curves. The manipulation machine embodying the present invention advantageously overcomes these limitations and shortcomings of the prior art.

Briefly, the manipulation apparatus herein disclosed and described secures control over a workpiece and manipulates such workpiece so as to produce a desired path or track along or across such workpiece which will pass over or through a workstation or workpoint. Manipulation of the workpiece may be such so that the speed at which such workpiece passes through the workstation is a constant and/or predetermined speed. In addition where the workstation is a sewing station it may be desired that a predetermined relationship exist between the stitching rate and the speed at which the workpiece passes through such sewing station. In accordance with such desire the present machine may control and manipulate a work piece so that such workpiece passes through a sewing station at a rate which is proportional to the stitching rate of the sewing machine. The passing of a path on a workpiece through a sewing station at a speed or rate which is proportional to the stitching rate of the sewing machine is particularly desirable when the stitching is visible, and it is preferred that the stitches be uniformly spaced along that path, as in decorative stitching, for example.

It will be appreciated that the term "workstation" is intended to include a stitching station or workpoint of a sewing machine or any other bonding station, which bonds two or more workpieces together by, for example, stitching, thermal-adhesion, adhesive bonding or any other type of bonding or performs decorative stitching or serging or any combination thereof. In addition, such workpoint may produce a printing or embossing function or any type of decoration or trim operation. It is contemplated that the workstation may be a cutting station through which the workpiece is manipulated so that a particular shape panel is cut from a panel blank.

It will further be appreciated that the "workpiece" is intended to include a single layer or a multi-layer piece and the material content of such layer may be a substantially limp material such as cloth or fabric, limp plastic, leather, paper or any other limp material similar to cloth or fabric or any combination of such materials.

Although the present invention will be described relative to its use in controllably propelling or manipulating a fabric workpiece through a sewing station for stitching two layers of a workpiece together, it should be understood that the present invention has wide application and is not limited to such particular use and function.

The novel manipulation machine of the present invention may conveniently be employed as a unit or component in association with other equipment for performing a function in the process of manufacturing a garment. The garment may, for example, be a pair of trousers and the workpiece on which work is performed may, for example be a pocket body on which a pocket facing has previously been sewn along the internal edge of the facing. The workstation may be the sewing station of a sewing machine which sews the outer edges or perimeter of the layers together as the perimeter of the workpiece is manipulated through the sewing station, for example.

In addition to the manipulation apparatus, cooperating equipment may include a workpiece supply or feeding means or station, a means for registering or orienting the workpiece into a known, predetermined position with respect to the workstation, a means of transferring the workpiece in known relation onto the worksurface of the manipulator apparatus so that the workpiece may be manipulated or guided as desired through the workstation and transfer or removal means which removes the workpiece after having had work performed thereon.

With respect to the present novel manipulation device the preferred embodiment as illustrated herein includes a worksurface having low friction characteristics. Above the low friction surface is a frame or mounting which supports a track or rod extending lengthwise and substantially parallel to the worksurface. A carriage rides along such rod and is driven by a means which controls the speed, length and direction of travel along the rod. In the preferred embodiment the speed of travel, the length of travel and the direction of travel are functions of the contour of the cam surface on a disc and the speed of rotation of such disc. An arm is pivotally coupled to the carriage so that the arm may travel arcuately in the horizontal plane rotating about a vertical axis substantially orthogonal to both the worksurface and the rod. The arm is biased in one rotational direction (counter clockwise, for example) and a second cam surface serves two funtions partially rotating the arm about its pivot against the biasing means (clockwise, for example). At the end of the arm is a rotatable stem which essentially revolves about the pivot axis of the arm and is caused to rotate about its own axis which is substantially parallel with the pivot axis. Rotation of the rotatable stem is a function of the angular position of the rotatable arm and the contour of a third cam surface. Thus, the velocity and position and angular orientation of the stem with respect to a fixed frame of reference, such as a workpoint, are determined by the contour of each of three cam surfaces. The rotatable stem extends downward toward the worksurface and has coupled thereto a workpiece holder. The rod, carriage, arm and stem (and the workpiece holder) and the second and third cams are mounted in a vertically movable frame which is lowered so that the workpiece holder may contact and secure a workpiece for guiding or manipulating the workpiece across the worksurface so that the workpiece is passed through the workstation, and is raised to release the workpiece after the manipulation of such workpiece is finished.

It is therefore an object of the present invention to provide apparatus for manipulating a workpiece through a workstation along an irregular contoured path.

Another object is to provide apparatus for guiding a workpiece through a workstation along an irregular contoured path so that each point in sequence of the path across the workpiece approaches the workpoint at a desired angular relationship.

Another object is to provide apparatus for guiding a workpiece so that an irregular contoured path along the edge or across the face of the workpiece passes through a workstation and that portion of the workpiece passing through the workstation passes through such workstation at a rate which is proportional and related to the rate of work performed in the workstation.

Another object is to provide manipulation apparatus which may conveniently include workpiece feeding and workpiece removal apparatus for performing a step or function of a manufacturing process with little or no manual participation.

These and other objects will become more fully understood from reading the following detailed description with reference to the accompanying drawings in which.

FIG. 4 including 4a, 4b and 4c illustrates different shape panels or workpieces which may conveniently be manipulated through a workstation for performing work thereon, and FIG. 5 is a representative drawing helpful in understanding one type of coordinated control usable with the present invention.

Figure 1:
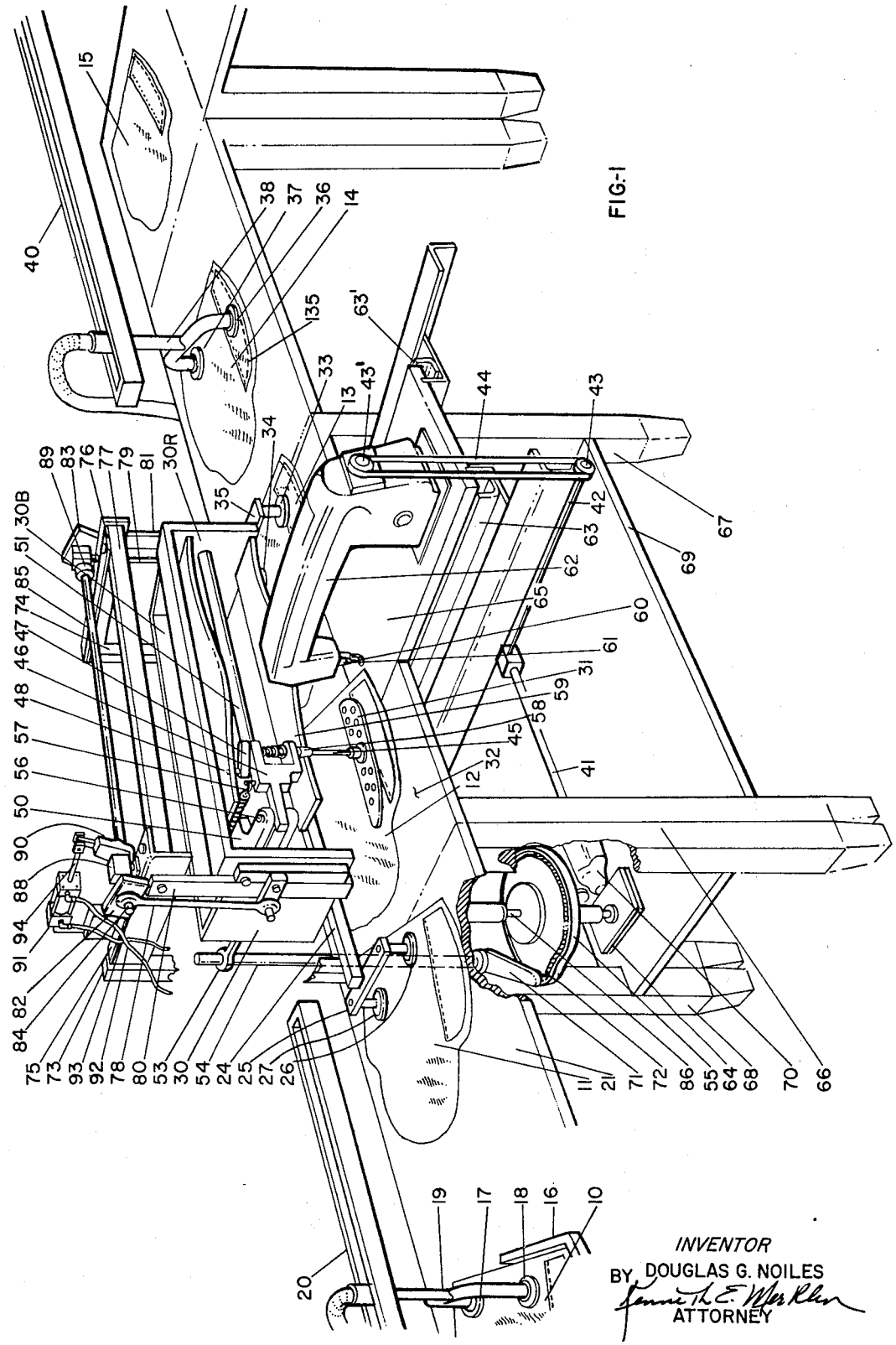
FIG. 1 is an illustration of a workpiece manipulating system including a feeding and registration station, manipulation apparatus, workstation and workpiece removal station with a preferred embodiment of the manipulation apparatus in perspective view.

Referring to FIG. 1 a workpiece manipulation system for sewing an irregular contoured part of a pocket body, is illustrated. The system here illustrated includes a workpiece registration station for registering a workpiece in a predetermined position and orientation, a workpiece transfer device for removing the workpiece from the registration station, further advancing the workpiece through the automatic process, and for depositing the workpiece at a precise location and orientation in preparation for the manipulation device which includes a workpiece infeed transfer device, the multiple cam workpiece manipulator, the workstation through which the workpiece is guided and a workpiece remover and a second workpiece transfer device which removes and transfers the workpiece from the work-surface of the manipulator after performance of work thereon.

As seen in the apparatus illustrated in FIG. 1, the various components of the system may be coordinated in operation so that a plurality of workpieces may be in various sequential stages of the work cycle. The work performed by the apparatus is accomplished in cyclic, coordinated stages or steps. In this regard it will be seen that a workpiece 10 is registered in the registration station with its position defined by the angular stop 16. At the same time the previously registered workpiece 11 is under the control of the workpiece infeed transfer cups 26 and 27. The workpiece 11 was transferred in coordinated movement from the registration station by a supply transfer device represented as a vacuum transfer unit including vacuum cups 17 and 18 and vacuum tube 19 which lifts and removes each registered workpiece from the registration station and transfers such workpiece onto the surface 21 into the position as illustrated by workpiece 11, the vacuum transfer unit travelling along the overhead track or mounting 20.

The workpiece infeed transfer device 25, 26, 27 is operated in cooperation with a carriage 50. After a workpiece (such as 11) is deposited on the surface 21, the infeed transfer device (including cups 26 and 27 on arm 25 coupled to rod 24) is positioned above the deposited workpiece 11. The rod 24 is coupled to carriage 50 which is mounted in a vertically movable mounting 30. The mounting 30 is lifted for releasing the workpieces which were under the control of the cups 26 and 27 and under the workpiece holder 31 and the cups 33 and 34 to return the carriage 50. (Rod 24 is coupled to carriage 50, and cross-bars 25 and 35 are coupled to rod 24, cups 26 and 27 are coupled to crossbar 25 and cups 33 and 34 are coupled to crossbar 35.) In the workpiece contacting position the mounting 30 is lowered, and the respective workpieces on the worksurfaces are clamped by the respective component, i.e. cups 26 and 27 clamp a workpiece such as 11 on surface 21, workpiece holder 31 clamps a workpiece such as 12 on surface 32, and cups 33 and 34 clamp a workpiece such as 13.

The cups 26 and 27 may include a high friction material on the bottom of each so that as the rod 24 is moved horizontally (as will be described more fully below) the workpiece is slid across the worksurface 21 and onto the worksurface 32 under control of the cups 26 and 27 to a position as illustrated by workpiece 12, where the positioned workpiece 12 is now clamped by the workpiece holder or clamp 31.

As will be more fully described below, the workpiece holder 31 is also coupled to the vertically movable mounting 30 and follows the same vertical travel as the workpiece infeeder apparatus coupled to rod 24. The workpiece holder 31 is lowered onto the workpiece 12 which had previously been moved to the worksurface 32 by the longitudinal movement of the workpiece infeed transfer cups 26 and 27, while the previous workpiece was being guided or manipulated through the workstation. It will be seen that workpiece 13 is positioned under the cups 33 and 34 which are on the crossbar 35. The crossbar 35 is coupled to the other end of the rod 24 thereby forming the workpiece outfeeder. It will thus be seen that three workpieces (as represented by 11, 12 and 13) are moved in unison by the workpiece infeeder, the workpiece holder and the workpiece outfeeder which are essentially linked and moved longitudinally and vertically in unison.

Upon release of the workpiece by the workpiece outfeeder at the position 14 a second workpiece transfer device secures or grasps the workpiece 14 and removes it to a remote storage position 15. This second workpiece transfer or delivery device is represented as a vacuum transfer device including vacuum cups 36 and 37 and vacuum tube 38 travelling along an overhead track or mounting 40. The workpiece 15 may then be removed for additional work or may be stored for later use, if desired.

The supply transfer device which travels in the mounting 20 and the delivery transfer device which travels in the other mounting 40 are coordinated in operation with the longitudinal movement of the workpiece infeeder (24, 25, 26, 27), the workpiece holder 31, and the workpiece outfeeder (33, 34, 35, 24). Thus, as many as five workpieces may be in various stages in the cycle of the apparatus illustrated.

Figure 2:
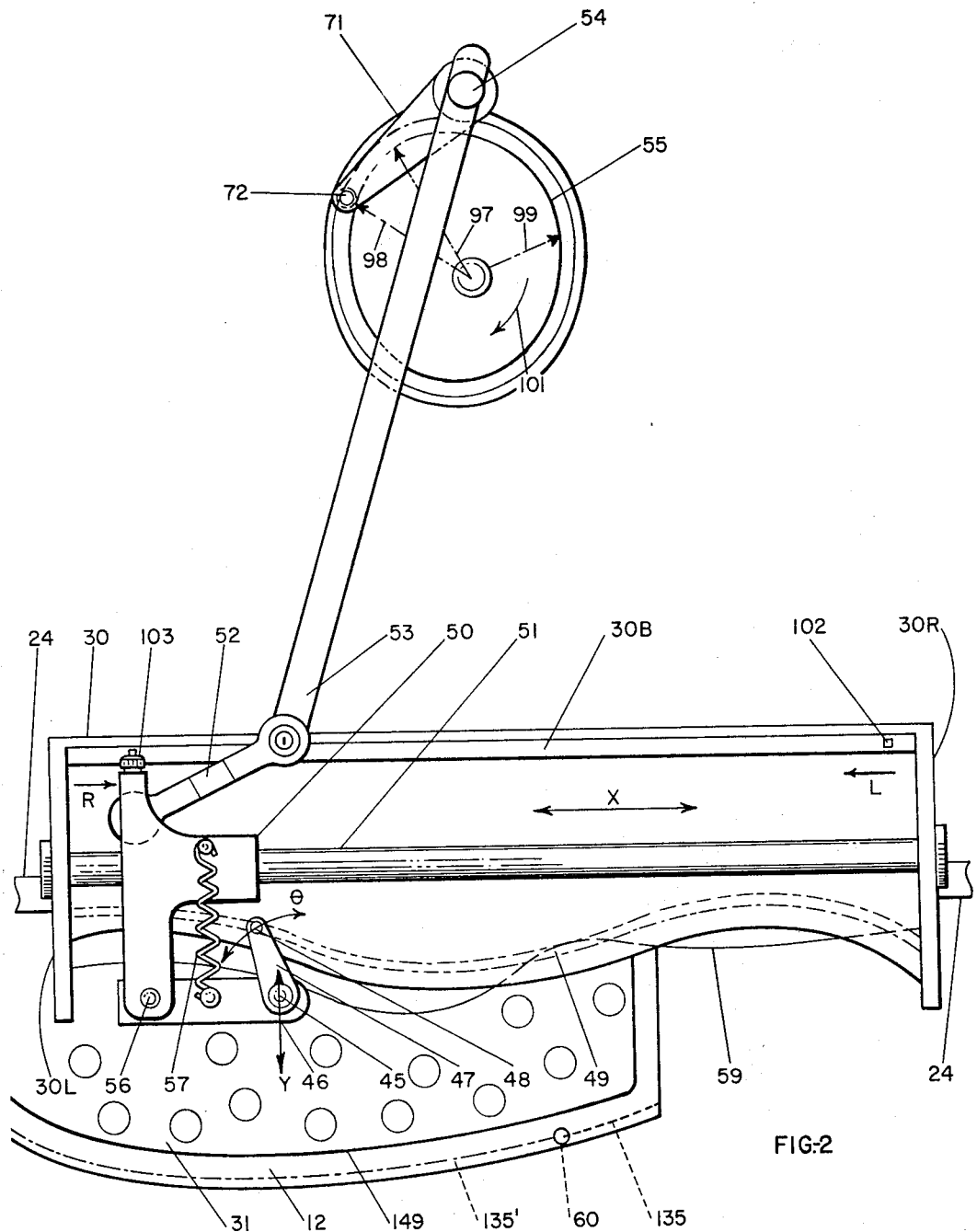
FIG. 2 is an overhead view of part of the manipulation apparatus particularly showing the cam controlled carriage, the linkage between the carriage and cam and the rods along which the carriage is driven.

In order to manipulate the workpiece in the work-station, the workpiece holder or clamp 31 is coupled to a stem 45 which is rotatably mounted at the extremity of an arm 46, and extends out of the top thereof. The arm 46 enables movement (as shown in FIGURE 2) of the workpiece holder 31 in the Y-coordinate direction. An arm 47 is secured to the stem 45 to control the rotational position of the stem (and therefore the angular position of holder 31) by the angular position of this arm 47, with respect to the axis of stem 45. At the other end of arm 47 is a cam follower roller 48 riding in a cam track 49. The track 49 functions as a cam controlling the angular position of arm 47 and therefore the rotational position ($\theta$-position) of the stem 45 and of the workpiece holder 31.

The arm 46 is pivotally mounted on a carriage 50 by pin 56. Carriage 50 rides on a rod 51 and a bar 30B. The carriage 50 is coupled through linkage arms 52 and 53 (see FIG. 2) to a rotatable vertical drive shaft 54. Rotation of the shaft 54 drives or urges the arms 53 and 52 arcuately through an angle as controlled by the position of a follower 72 on arm 71 coupled to shaft 54. Follower 72 rides in the track of a cam 55 thereby following the contour of the cam track. The rotational position of shaft 54 is a function of the position of follower 72 which is a function of the contour of the track of cam 55. Thus, the movement of the carriage 50 along the rod 51 is produced by rotation of the cam 55, and this movement is called the X-coordinate movement.

The arm 46 is biased by a spring 57 so that a cam follower 58 (FIG. 3) mounted on the stem 45 rides against the surface of the cam face 59. It will be seen that the cam follower 58 follows the contour of cam face 59 by virtue of the position of carriage 50 and the bias of spring 57 and in so doing, the arm 46 is pivoted about the axis of mounting pin 56 thus revolving the stem 45 about the axis of pin 56 so as to produce movement of the workpiece holder 31 in the Y-coordinate direction.

With reference to FIG. 2, it may be said that the contour of the cam face 59 positions the axis or center line of stem 45, and therefore of the workpiece holder 31 in the Y-coordinate or lateral position on the worksurface 32; that the contour and rotation of cam 55 controls the longitudinal position, direction and speed of progression of the carriage 50 on the rod 51 and therefore the X coordinate of the stem 45 and of the workpiece holder 31; and the cam track 49 controls the angular position of the arm 47 and thus the rotational position of the stem 45 thereby controlling the rotational or $\theta$ position of the workpiece holder 31. Thus, the three cam surfaces combine to control the X, Y and $\theta$ coordinates of the position and orientation of the workpiece holder 31. The contours of these cams may be mathematically calculated to move or guide the workpiece holder 31 so that a workpiece moved under the control of the workpiece holder may be propelled or manipulated so that a desired path along or across such workpiece passes through a predetermined point such as the workpoint 60/61 (61 being the needle of sewing machine 62, and 60 representing the throat into which the needle passes when the needle penetrates the workpiece). In this example the workpiece is manipulated preferably such that each point in sequence along the contour path to be sewn approaches the needle or workpoint with a desired angle of approach to the workpoint and passes through the workpoint in a direction parallel to the local portion of the sewpath and the rate of travel of each successive point through the workpoint is coordinated with the stitching rate of the sewing machine.

The workpoint is represented on the worksurface 65 as a circle 60 which represents the throat through which the needle 61 passes for stitching materials. The needle 61 is illustrated as part of a sewing machine 62 which is mounted on a mounting plate 65 positioned in the members 63+63' extending out from under the worksurface 32. A control means for driving the sewing maching is coordinated with the position and orientation of the workpiece holder 31 so that the sewing machine 62 will start operating when the workpiece is presented at the workpoint 60 and will stop operating at a second predetermined position and orientation of the workpiece holder 31. This is one method of control of the sewing machine. FIG. 5 represents another method of control.

The sewing machine may include an accessory part such as a thread cutting device (not shown) which may cut the thread after the sewing operation is completed.

FIG. 1 represents one arrangement of effectively driving the manipulation machine and a sewing machine from a common drive means. A motor 70 is illustrated as driving the cam 55 via a gear box 64. Shaft 41 is driven by the motor 70 and is coupled to a shaft 42 and thence to pulley 43 and by belt 44 to the the drive wheel 43' of the sewing machine 62.

With respect to the manipulation; system, a workpiece such as 10, for example may be positioned in the registration station by any manner, such as manually or automatically, for example as by workpiece transfer units such as shown in copending application Ser. No. 475,986 filed July 30, 1965, by co-inventors George F. Hawley and John H. Buettner under the title "Methods and Apparatus for Automatically Transferring and Registering Fabric Workpieces and for Combining Them," and assigned to the same assignee as the present application or as shown in copending application Ser. No. 619,302 filed Feb. 28, 1967, by co-inventors Herman Rovin and Fred J. Schiffmacher under the title "Methods and Apparatus for Automatically Registering and Combining Fabric Workpieces," and assigned to the same assignee as the present application.

The registration station may be similar to that taught in the said copending application Ser. No. 475,986 or the said copending application Ser. No. 619,302, for example.

As seen in FIG. 1 the work surface 32 is supported by a set of four legs, of which 66, 67 and 68 are visible. A shelf 69 is illustrated as supporting the motor 70 (partly shown) and is the mounting support for the cam 55, including gear box 64, which is driven by motor 70.

Figure 3:
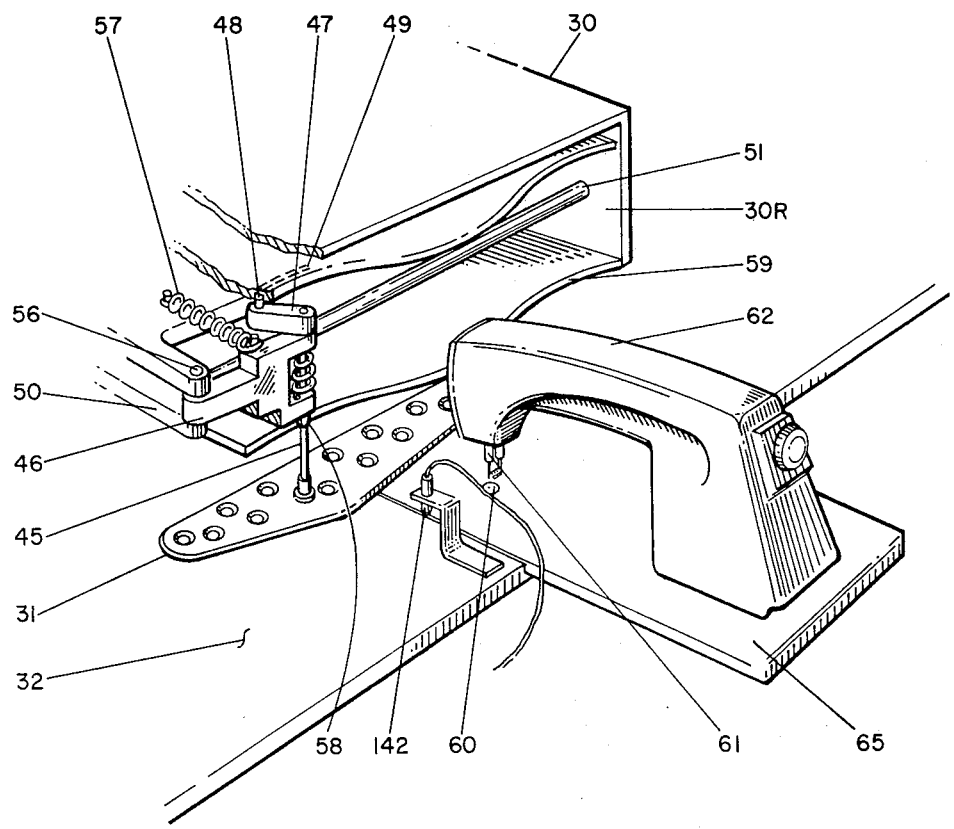
FIG. 3 is a perspective view of the arm pivotally coupled to the carriage and rotatable stem on which the workpiece holder is mounted.

This manipulating apparatus includes elevator means for lowering and raising a movable frame 30 (FIGS. 1, 2 and 3). The frame 30 is lowered so as to engage the workpiece holder 31 down upon the workpiece for manipulating it, and the frame 30 is raised to disengage the holder 31 from the workpiece. This lowering and raising of the movable frame 30 also serves to engage infeeder and outfeeder means with respective workpieces. A stationary frame (FIG. 1) formed by the vertical members 73 (shown partially cut away) and 74 and the horizontal members 75, 76 and 77 is mounted above and extends over the surface 32. The vertical movable frame 30 is suspended under the horizontal members 75, 76 by suspension links 78 and 79, and the movable frame 30 slides up and down along a pair of guide bars 80 and 81 extending downwardly from the members 75 and 76, as the supension links 78 and 79 are raised and lowered.

The suspension links 78 and 79 are coupled, at their lower ends to the opposite sides 30L and 30R of the frame 30. At their upper ends the suspension links are each pin-coupled at 84 to crank levers 82 and 83, respectively, which are secured to, and move with a pivot shaft 85. Thus, rotation of shaft 85 causes the suspension links 78 and 79 to either raise or lower the movable frame 30, with respect to the work surface 32. The pivot shaft 85 is journaled in bearings 88 and 89 mounted on horizontal members 75 and 76.

To rotate the shaft 85, an arm 90 is coupled thereto and the other end of this arm is pinned to a piston rod 94 of an actuating piston within a cylinder 91. For actuating the cylinder 91 there are hoses 92 and 93 connected to its opposite ends. By applying fluid pressure, such as compressed air from a source through one or the other of the hoses the piston in the cylinder 91 is moved and the piston rod 94 moves the arm 90 to rotate the pivot shaft 85 to raise or lower the vertically movable frame 30. Pressure applied to cylinder 91 via hose 92 will retract piston rod 94 while pressure applied via hose 93 will extend this rod.

Application of pressure via hoses 92 and 93 may be controlled so that actuation of the vertically movable frame 30 is coordinated with the position and direction of travel of the carriage 50. The position and direction of travel of the carriage 50 is controlled by the contour of cam 55 and the rotational position of cam 55. When, for example cam 55 is rotationally positioned such that radius 97 (FIGS. 2 and 5) is substantially aligned with the follower 72, the linkage 71–53–52 will position the carriage 50 to its extreme initial position against the section 30L of frame 30. As illustrated in FIG. 2, the radius 98 (which is shorter than radius 97) is aligned with the cam track follower 72 and the carriage 50 has been moved in direction R away from the section 30L toward the section 30R. Thus, by coordinating application of pressure to the hoses 92 and 93 with the rotational position of cam 55 the vertical position of the movable frame 30 may be coordinated with the position and direction of travel of carriage 50.

When the radius 97 is aligned with the cam track follower 72 pressure may be applied to the cylinder 91 via hose 92 thus driving the piston and rod 94 forward thereby rotating pivot shaft 85 (clockwise) to lower the movable manipulation assembly carried in frame 30 so that the workpiece holder 31 and the infeed cups 26 and 29 and outfeed cups 33 and 34 engage down upon a workpiece, such as 12, 11 and 13 respectively, which have previously been positioned thereunder, on the work surfaces 32, 21 and 32 respectively.

As the cam 55 rotates (in the direction of arrow 101, FIG. 2) the follower 72 follows the shortening radius of the track of cam 55 and thus effectively drives the carriage 50 in direction R. Displacement of the carriage 50 across or along rod 51 depends upon the change in radius of the cam 55 and thus the position of the follower 72 with respect to the axis of cam 55. When the radius 99 (here assumed to be the shortest radius) is substantially aligned with the follower 72, then the carriage 50 will be substantially against the section 30R at the termination of its work stroke.

At this point in the rotational position of cam 55, pressure is relieved from hose 92 and is applied to hose 93, withdrawing the piston rod 94 to raise the frame 30 of the manipulation assembly along the guide bars 80 and 81. With the manipulation assembly thus raised so that the workpiece holder 31 and the cups 26, 27, 33 and 34 are lifted off of the respective workpieces, the carriage 50 is then returned (in the direction L) to the section 30L by continued rotation of cam 55, which increases in radius between radii 99 and 97.

As indicated above, the rod 24 may be connected to the carriage 50 so that the rod 24, and more particularly the cups 26, 27, 33 and 34 move longitudinally in coordination with the workpiece holder 31.

As the carriage 50 progresses forward in direction R along rod 51 in the X coordinate, the arm 46 pivotally coupled to the carriage 50 also progresses, and the follower 48 follows in the track 49 (see FIG. 2). According to the distance between the track 49 and the axis of stem 45, the stem 45 is rotated by the arm 47, thus controlling the $\theta$ or rotational position of the workpiece holder 31. In addition, the biased cam follower 58 (FIG. 3) rides on the face of the Y-coordinate cam 59. The biasing spring 57 holds arm 46 so that the cam follower 58 rides on the cam face 59. Thus follower 58 and cam 59 determine the Y-coordinate position of stem 45.

The combined $\theta$ cam and Y cam faces coordinate to position the workpiece holder 31 both rotationally ($\theta$) and laterally (Y-coordinate) with respect to the workpoint 60/61 and the cam 55 controls the progression of the carriage 50 in the direction R such that the path across the workpiece which passes through or over the workpiece 60/61 follows a predetermined path and direction, and the workpiece passes through such workpoint 60/61 at a predetermined rate. The rate at which that portion of the workpiece passes through the workstation may be proportional to the rate at which work is being performed at the workstation. In the case of a sewing machine, the rate at which a workpiece is passed through the sewing station may be proportional to the stitching rate of the sewing machine. This may be accomplished by employing a common drive, such as motor 70 with positive drive means so that the rate of rotation of cam 55 is proportional and/or coordinated with, the rate of operation, or the stitching rate, of sewing machine 62.

The $\theta$ parameter of the stem 45 (and thus the scope of rotational movement of the workpiece holder 31) may be increased by employing a multiplying device between the follower 48 and the stem 45. For example, the position of follower 48 (and thus the angular position of arm 47) may be used to control a servo for essentially amplifying the angular position of arm 47. The servo may be used to position the stem 45, rotationally.

Although the structure and components illustrated in FIGS. 1, 2 and 3 are the preferred embodiment of the manipulation apparatus, other structure and/or components may be used to provide the functions of the structure and components illustrated.

Figure 4A:
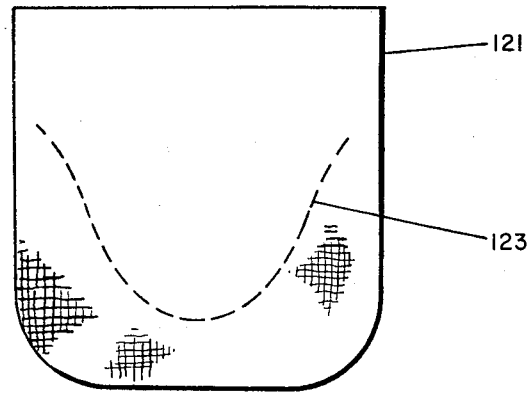
Figure 4B:
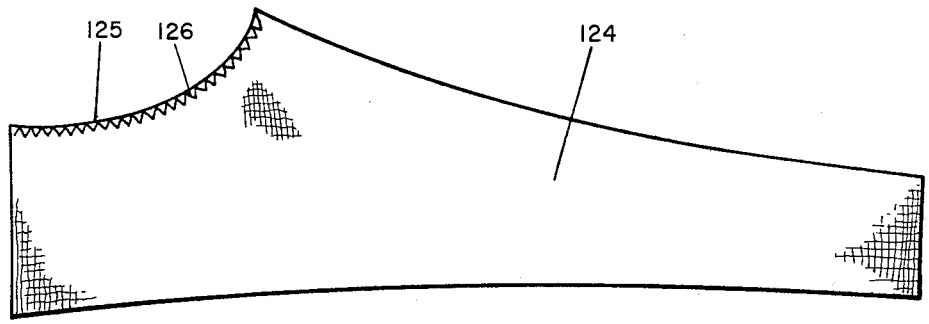
Figure 4C:
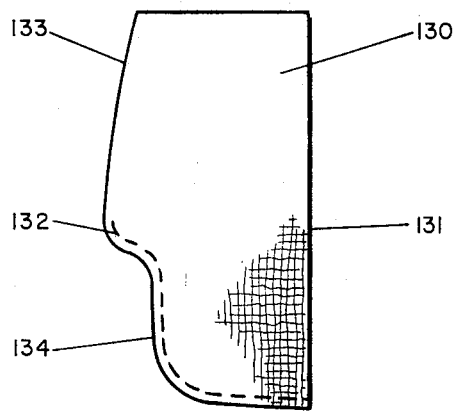

Referring to FIGS. 4a, 4b and 4c, three panels are illustrated which include three different types of stitching functions, each of which may be conveniently performed by using the workpiece manipulation machine for driving the panel or workpiece through a workstation.

FIG. 4a, for example, illustrates a panel 121 on which a decorative stitch pattern or path 123 is sewn on the face of the panel. The panel 121 may be decoratively stitched with a curved pattern or contour of stitches such as represented at 123. The panel 121 is manipulated through a sewing station with successive panels being similarly manipulated such that the stitch pattern 123 is identical on each panel.

FIG. 4b, for example, illustrates a panel 124 on which the irregular contoured edge 125 is serged. This panel 124 having an irregularly contoured edge 125 may be manipulated so that this edge passes through the workstation of a serge stitching machine or serger. Advantageously the panel edge 125 is presented to the serger at the proper angle of approach at all times so that the edge is serged along its contour as represented by the edge stitching path 126.

FIG. 4c represents a front trouser pocket 130 which is folded along the line 131 and is sewn along the combined edges 134, as represented by stitches 132. The opening into the pocket is at 133. The stitch line 132 is of irregular contour, and the folded pocket body 130 may advantageously be guided through a sewing station by a manipulation machine as described above for sewing the combined edges 134 of the pocket body by a path of stitches 132.

FIG. 1 shows another form of panel which has an irregular contoured edge which panel is manipulated through the sewing station so that two layers of the panel or workpiece are sewn together along the contoured stitch path 135.

The surfaces 21 and 32 are low friction surfaces such that sliding resistance between the workpiece and such supporting surfaces will be minimum and the workpieces will readily slide across the surface. The workpiece holder 31 may include on its underside high friction material, such as a layer of sponge rubber, for example, so that when the workpiece holder 31 makes contact with a workpiece, such as illustrated as 12, the friction between the workpiece and the worksurface will be minimal while the friction grip between the workpiece and the workpiece holder will be maximal. Thus, when the workpiece holder 31 is in contact with the workpiece, the workpiece is positively driven across the worksurface, substantially resistance free, with respect to the worksurface. Thus, the workpiece will follow exactly the desired path through which the workpiece is to be manipulated by the workpiece holder. Generally, as shown in FIGURE 2, the edge 149 of the workpiece holder extending near to the desired stitch path 135' preferably approximates the contour of this proposed stitch path. The reference number 135 indicates the portion of the stitch path along which stitches have been formed. The local portion of the path which is located at the workpoint 60 is where the stitches are formed in sequence.

The infeed cups 26, 27 and outfeed cups 33 and 34 may also include high friction material on their underside so that when the cups contact the workpiece movement or progression of the cups during contact with the workpiece will slide the workpiece along the worksurface as the carriage 50 progresses along the rail 51 (the cups being essentially coupled to the carriage 50 via the rod 24).

When operating the manipulator machine as an individual unit a workpiece may be positioned on the surface 21, such as workpiece 11. Such workpiece may be positioned there during the cycle of operation of the manipulator when the cups 26, 27, 33 and 34 and workpiece holder 31 are lifted or raised somewhat above the worksurface and/or the carriage 50 is at 30R extremity of X displacement. In the cycle of operation of the manipulation machine the workpiece holder and cups are lifted or raised when the carriage 50 (and the apparatus coupled to the carriage) reaches its extreme right or terminal position. This may be synchronized with the rotational position of cam 55, for example as previously explained. When the workpiece holder 31 and workpiece holding cups 26, 27, 33 and 34 are raised, contact between the respective workpieces and the respective holding components is broken, thus leaving the workpieces substantially free from the feeding components. At this point in the cycle, the carriage 50 is returned to its extreme left or initial position. This is accomplished by urging the cam follower 72 away from the axis of rotation of cam 55 thus causing rotatable shaft 54 to be rotated clockwise (as illustrated) so that the linkage arms 52 and 53 urge the carriage 50 along the rod 51.

During this return stroke of the carriage 50 is the period when a workpiece may be positioned on surface 21 such as represented by workpiece 11. The workpiece previously at that position, had been moved to the position represented by workpiece 12 during the previous progression of the carriage from extreme left to extreme right. Now that a new piece has been placed at 11 and before starting the next forward translation of carriage 50 from left to right, the holding components are lowered (it was previously described that the entire vertically movable frame 30 is lifted and lowered) so as to make contact with the workpiece positioned on the worksurface. Thus, the workpiece held by or in contact with the respective holding component can now be moved along the worksurface as the holding component is moved across the worksurface.

The workpiece held by infeed cups 26 and 27 and the workpiece held by outfeed cups 33 and 34 are each slid linearly during progression of the carriage 50 (and associated holding components) from left to right, while the workpiece held by the workpiece holder 31 is manipulated so that a selected or predetermined path along and/or across this workpiece passes through the workpoint 60/61 during this phase or cycle of the operation. The workpiece under the control of the workpiece holder 31 follows the movement of the workpiece holder, and the path along or across the workpiece passing through the workpoint 60/61 is a function of the original position of the workpiece with respect to the workpiece holder and the subsequent X, Y and $\theta$ coordinated movements of the workpiece holder imparted to the workpiece.

As the workpiece is guided so that the workpiece passes through the workpoint 60/61 the workpiece may be sewn, as illustrated, along the path 135. The sewing machine 62 may include a presser foot and a feed dog (not shown) of conventional type, according to the type of sewing machine 62 used. Operation of the sewing machine may be coordinated with the cyclic operation of the manipulation apparatus, if desired. This coordination may be accomplished by the actuation of a synchronizing control switch or by start and stop switches located in the path of travel of the carriage 50, or the control may include actuation of start and stop switches by the workpiece itself as it is moved under the control of the workpiece holder 31. This latter control arrangement may include workpiece-position sensitive switches located in the worksurface, for example.

In practice, photosensitive cells have been used successfully. When using two photosensitive cells as shown in FIGURE 5, for example, a sewing machine may be made to operate when one or both are deactivated or covered with a part of the workpiece. By locating one photo-cell on either side of the workpoint 60, substantially in the path of that portion of the workpiece passing through the workpoint, the sewing machine may be made to operate just prior to presentation of the leading edge of the workpiece to the workpoint (i.e. the needle 61 and throat 60) and may be made to discontinue operation just after the trailing edge of workpiece passes through the workpoint. Upon cessation of operation of the sewing machine a thread cutting device (not shown) may be actuated and cut the tail of stitches.

FIG. 5 represents one arrangement in which a sewing machine is driven by the same source as the cam 55, that is motor 70, and operation of the sewing machine is made responsive to the presence of a workpiece, presented to the workstation.

The motor 70 is represented as driving the cam 55 and also applying a driving force to a drive box 145. The drive box 145 may include a gear arrangement and a clutch, the clutch being an electric clutch, for example, which is engaged when electric power to the clutch is shut off. Upon engagement, the clutch 145 couples the driving force of the motor 70 to the sewing machine 62 for operating the sewing machine. A pair of photosensitive cells 140 and 141 are positioned in the sewing line or path with one photo-cell 140 positioned on one side of the throat 60 and the other photo-cell 141 positioned on the other side of the throat 60 essentially in alignment with an imaginary line 146–147 (shown dashed) through the workpoint 60 which corresponds with the desired direction of movement of the successive points of the local portion of the workpiece stitching path passing through the workpoint. That is, the local portion of the stitch path is moving substantially tangential to the line 146–147. The block 140a represents the function of the photo-cell 140 and block 141a represents the function of photo-cell 141.

A light source 142 is positioned above the photo-cell 140, and another light source 143 is similarly arranged with respect to the photo-cell 141. When the light sources illuminate the photo-cells the respective photo-cells act as closed contacts to complete a circuit, for they are connected in series with a source of power 148. For convenience the photo-cells 140 and 141 may be positioned under the worksurface of the plate 65 and an aperture (such as at 146 and 147) may be used to permit the light sources to energize the cells.

Thus, when a workpiece is presented to the workpoint (60/61) so that the light to the photo-cell 140 is interrupted, the circuit controlling the clutch 145 will effectively open thereby engaging the clutch so that the sewing machine will be driven by the motor 70.

This represents one way of controlling operation of the sewing machine by the presence of a workpiece and of maintaining synchronized operation between rotation of the carriage drive cam 55 and reciprocation of the needle 61 of the sewing machine 62.

In FIG. 3, a light source 142 is illustrated as mounted above the surface 32 for convenience. It may be preferred to mount the light source on the sewing machine mounting plate 65 since it may be desired to move the sewing machine 62. As seen in FIG. 1, the sewing machine mounting plate 65 is supported on members 63 and 63' along which the machine may be positioned by sliding the machine in or out, thus positioning the workpoint where desired.

When the manipulation apparatus is employed in a machine system such as illustrated in FIG. 1, workpiece transfer units such as the vacuum transfer units, for example, may be coordinated in their motion with the manipulation machine. This coordination may be accomplished by positioning an actuable switch, such as represented in FIG. 2 as switch 102 positioned on the track 30B along which a roller 103 rides.

In such a system the respective transfer units normally return to a lifted or retracted position with respect to the overhead track, i.e. vacuum cups 17 and 18 and vacuum tube 19 are suitably elevated toward track 20, and vacuum cups 36 and 37 and vacuum tube 38 are similarly elevated toward track 40. When thus elevated, the vacuum cups 17 and 18 are moved into position above the registration station at 10 so that when the cups and the tube are lowered the cups will contact the registered workpiece. Similarly, when elevated the cups 36 and 37 are moved into position above the removed workpiece 14, so that when the cups 36 and 37 are lowered, they engage this removed workpiece. In such a system the time period during which the vacuum transfer device normally returns to its retracted position is that time in the cycle of the manipulation machine during which the workpiece (12) is being manipulated through the workstation (sewing station 60/61); the workpiece (11) previously transferred and deposited on worksurface 21 is moved linearly by the workpiece infeed transfer cups 26 and 27, and workpiece 13 previously passed through the workstation is removed by the workpiece outfeed cups 33 and 34. Thus, the operating cycle of the respective vacuum transfer units 17, 18, 19 and 36, 37, 38 may commence when the roller 103 actuates the switch 102, such cycle being continuous to termination and coordinated with the sequential movements of the workpiece manipulating components of the manipulation machine, Alternatively, the transfer units 17, 18, 19, 20 and 36, 37, 38 can move in essential time and direction synchronism with carriage 50.

Registration of a workpiece in the registration station 10 may be accomplished during the transfer of another workpiece by the vacuum transfer device.

The vacuum transfer device 36, 37 and 38 normally returns to a retracted position on the track 40 thereby positioning the cups 36 and 37 above the workpiece 14 previously removed by the outfeed cups 33 and 34. Upon actuation of the switch 102 by the roller 103 operation of this vacuum transfer device 36, 37, 38 may also commence.

The completed workpiece such as represented by workpiece 14 will thereupon be transferred from the removal station to a remote delivery position 15 and there deposited, such as represented by the workpiece 15. The remote position may for example be associated with a conveyor which conveys the workpiece to another apparatus or may include such storage means.

The switch 102 may also be a synchronizing switch which serves to maintain operation of the transfer mechanism and the manipulation machine in synchronism.

The cyclic speed of the manipulation machine depends upon the speed of rotation of the cam 55 as explained above.

It is seen from the disclosure herein that the function of the cam 55 is to control the movement of the carriage 50 along the rod 51. By movement is meant both speed and direction. It will also be seen from the disclosure that once the carriage 50 begins its progress in the direction R, the carriage will continue to be driven in such direction continuously but the speed at which the carriage progresses in the direction R may vary or change. The carriage need not be driven to the extremes of the rod 51, the distance of travel of the carriage 50 depending upon the desired length of the path along or across the workpiece being manipulated through the workpoint or workstation 60/61.

As the carriage 50 progresses along rod 51, the arm 46 also progresses in like fashion so that the follower 58 rides along the cam surface 59 and controls the position of arm 46 and hence the position of the stem 45 in the lateral plane, i.e. in the Y-coordinate direction. In addition, the angular position $\theta$ of arm 47 is controlled by the differential in lateral spacing between the cam face 59 and the cam track 49. When this differential in spacing increases as measured in the Y-direction, then the arm 47 (and holder 31) rotate in a clockwise direction $\theta$ relative to the worksurface 32, and vice versa. The workpiece holder 31 is thus positioned in the X and Y coordinates and the θ positions (rotational position). Thus, a workpiece held or clamped under the workpiece holder, between the bottom surface of the workpiece holder 31 and the worksurface 32 is manipulated so that the desired path along and/or across such workpiece passes through the workpoint 60/61.

Since movement of the carriage 50 is a function of the speed of rotation and contour of the cam 55, a programmed device such as a programmed, variable speed reversible motor may be used to drive the carriage in the direction and speed desired. The contour of the cam face 59 and the contour of the cam track 49 may be changed to change the manipulated path followed by the workpiece through the workpoint or workstation.

What is claimed is:

1. Apparatus for manipulating a workpiece through a workstation containing a workpoint for causing a predetermined desired path across said workpiece to be presented to said workpoint such that every point along said path passes in sequence through said workpoint said apparatus comprising:
   a low friction surface across which said workpiece is slidable,
   a workpiece holder adapted to engage the upper surface of a workpiece on said low friction surface with high friction engaging grip,
   a carriage movable in a first coordinate direction (X) relative to said surface,
   means for driving said carriage for producing a first component of motion in said first coordinate direction X,
   a movable member pivotally coupled to said carriage constrained for moving with said carriage in said first coordinate direction X and free for moving in a second coordinate direction (Y) relative to said surface,
   means for acuately moving said movable member in said second coordinate direction Y in cooperation with movement of said movable member in said first coordinate direction X,
   a shaft coupled to said movable member constrained for moving with said movable member in said first coordinate direction X and said second coordinate direction Y and free for rotating about its axis, said shaft connected to said workpiece holder for imparting to said workpiece holder movement in said first coordinate direction (X) and said second coordinate direction (Y) and a rotational coordinate (θ),
   means for rotating said shaft in said rotational coordinate θ in cooperation with movement said other movable member in said first coordinate direction X and said second coordinate direction Y, and
   means for engaging said workpiece holder with the upper surface of a workpiece on said low friction surface for imparting movement of said workpiece holder to said workpiece for manipulating said workpiece through said workstation so that a predetermined desired path across said workpiece passes through said workpoint.

2. Apparatus for manipulating a workpiece through a workstation containing a workpoint for causing a predetermined desire path across said workpiece to be presented to said workpoint such that every point along said path passes in sequence through said workpoint said apparatus comprising:
   a low friction surface across which said workpiece is slidable,
   a workpiece holder adapted to engage the upper surface of a workpiece on said low friction surface with high friction engaging grip,
   a carriage movable in a first coordinate direction (X) relative to said surface,
   means for driving said carriage for producing a first component of motion in said first coordinate direction X, said driving means including
   a cam disc having an endless cam track,
   means for rotating said cam disc,
   a shaft mounted for rotating about its own axis,
   a control arm coupled to said shaft for controlling the rotational position of said shaft,
   a cam follower coupled to said control arm and adapted to ride in said cam track for controlling the angular position of said control arm according to the contour of said cam track, and
   crank lever means coupled to said shaft and to said carriage for urging said carriage in said first coordinate direction (X),
   a movable member coupled to said carriage constrained for moving with said carriage in said first coordinate direction X and free for moving in a second coordinate direction (Y) relative to said surface,
   means for moving said movable member in said second coordinate direction Y in cooperation with movement of said movable member in said first coordinate direction X,
   a shaft coupled to said movable member constrained for moving with said movable member in said first coordinate direction X and said second coordinate direction Y and free for rotating about its axis, said shaft connected to said workpiece holder for imparting to said workpiece holder movement in said first coordinate direction (X) and said second coordinate direction (Y) and a rotational coordinate (θ),
   means for moving said shaft in said rotational coordinate θ in cooperation with movement of said movable member in said first coordinate direction X and said second coordinate direction Y and
   means for engaging said workpiece holder with the upper surface of a workpiece on said low friction surface for imparting movement of said workpiece holder to said workpiece for manipulating said workpiece through said workstation so that a predetermined desired path across said workpiece passes through said workpoint.

3. Apparatus for manipulating a workpiece as in claim 2 and further including
   means for raising and lowering said workpiece holder relative to said low friction surface for engaging the said upper surface of said workpiece prior to manipulating said workpiece and for disengaging said upper surface of said workpiece following manipulation.

4. Manipulation apparatus for guiding a workpiece through a workstation containing a workpoint for producing components of motion and angular movement of the workpiece relative to said workpoint for causing a predetermined path across said workpiece to be presented to said workpoint and to be moved relative to said workpoint so that every point along said path passes through said workpoint in sequence, said manipulation apparatus comprising:
   a workpiece supporting surface upon which the workpiece is readily slidable,
   a movable workpiece holder for engaging said workpiece in a strong frictional grip thereupon,
   a movable carriage,
   drive means for moving said carriage for producing a first component of motion in a first coordinate direction (X),
   a movable member pivotally coupled to said carriage at one end of said member constrained to move with said carriage, the other end of said movable member being free to move arcuately relative to said carriage with a second component of motion in a second coordinate direction (Y),
   a shaft extending perpendicular to said supporting surface, said shaft being secured to said workpiece holder for driving said holder, said shaft being constrained for moving with said other end of said movable member thereby imparting to the axis of said shaft components of motion in the directions X and Y relative to said supporting surface for driving said workpiece holder through said workstation with components of motion in the directions X and Y, said shaft being rotatable about its axis with respect to said member, a control arm secured to said shaft for rotating said shaft about its said axis, a second cam extending generally along the route travelled by said carriage, said second cam for controlling the angular position of said control arm with respect to the axis of said shaft for producing rotational movement of said shaft about its said axis and thereby imparting rotational movement ($\theta$) to said workpiece holder about the axis of said shaft and means for raising and lowering said workpiece holder relative to said supporting surface for engaging said workpiece prior to manipulation thereof and for disengaging said workpiece following manipulation, by virtue of which the workpiece engaged by said workpiece holder and sliding upon said supporting surface is manipulated through said workstation with X and Y components of motion and rotational movement $\theta$ causing a predetermined desired path across the workpiece to be presented to said workpoint with every point along said path passing in sequence through said workpoint.

5. Manipulation apparatus for guiding a workpiece through a workstation containing a workpoint for producing components of motion and angular movement of the workpiece relative to said workpoint for causing a predetermined path across said workpiece to be presented to said workpoint and to be moved relative to said workpoint so that every point along said path passes through said workpoint in sequence, said manipulation apparatus comprising:

a workpiece supporting surface upon which the workpiece is readily slidable, a movable workpiece holder for engaging said workpiece in a strong frictional grip thereupon, a movable carriage, drive means for moving said carriage for producing a first component of motion in a first coordinate direction (X), a movable member constrained to move with said carriage, said movable member being free to move relative to said carriage with a second component of motion in a second coordinate direction (Y)

a first cam extending generally along the route travelled by said carriage, said first cam controlling said movable member for moving said member in the Y direction relative to said carriage as said carriage and said member progress in the X direction thereby imparting to said movable member components of motion in both of the directions X and Y, a shaft extending perpendicular to said supporting surface, said shaft being secured to said workpiece holder for driving said holder, said shaft being constrained for moving with said movable member thereby imparting to the axis of said shaft components of motion in the directions X and Y relative to said supporting surface for driving said workpiece holder through said workstation with the components of motion in the directions X and Y, said shaft being rotatable about its axis with respect to said member, a control arm secured to said shaft for rotating said shaft about its said axis, a second cam extending generally along the route travelled by said carriage, said second cam for controlling the angular position of said control arm with respect to the axis of said shaft for producing rotational movement of said shaft about its said axis and thereby imparting rotational movement ($\theta$) to said workpiece holder about the axis of said shaft and means for raising and lowering said workpiece holder relative to said supporting surface for engaging said workpiece prior to manipulation thereof and for disengaging said workpiece following manipulation, by virtue of which the workpiece engaged by said workpiece holder and sliding upon said supporting surface is manipulated through said workstation with X and Y components of motion and rotational movement $\theta$ causing a predetermined desired path across the workpiece to be presented to said workpoint with every point along said path passing in sequence through said workpoint.

6. Manipulation apparatus for guiding a workpiece through a workstation containing a workpoint as in claim 5 in which, said first cam defines a cam surface extending generally along the route travelled by said carriage and said movable member includes a cam follower and spring means coupled to said movable member and said carriage for urging said movable member toward said cam surface for maintaining said cam follower against said cam surface for following said surface and for moving said member in the Y direction as said carriage and said movable member progress in the X direction.

7. Manipulation apparatus for guiding a workpiece through a workstation containing a workpoint for producing components of motion and angular movement of the workpiece relative to said workpoint for causing a predetermined path across said workpiece to be presented to said workpoint and to be moved relative to said workpoint so that every point along said path passes through said workpoint in sequence, said manipulation apparatus comprising:

a workpiece supporting surface upon which the workpiece is readily slidable, a movable workpiece holder for engaging said workpiece in a strong frictional grip thereupon, a movable carriage, drive means for moving said carriage for producing a first component of motion in a first coordinate direction (X), a movable member pivotally coupled to said carriage at one extremity constrained to move with said carriage, the other extremity of said movable member being free to move relative to said carriage with a second component of motion in a second coordinate direction (Y), said other extremity including a cam follower, a first cam, defining a cam surface, extending generally along the route travelled by said carriage, said first cam controlling said movable member for moving said member in the Y direction relative to said carriage as said carriage and said member progress in the X direction thereby imparting to said movable member components of motion in both of the directions X and Y, spring means coupled between said movable member and said carriage for urging the said other extremity toward said cam surface for maintaining said cam follower against said cam surface for producing movement in the said Y direction at said other extremity as said carriage and said movable member progress in the Y direction, a shaft extending perpendicular to said supporting surface, said shaft being secured to said workpiece holder for driving said holder, said shaft being constrained for moving with said other extremity of said movable member thereby imparting to the axis of said shaft components of motion in the directions X and Y relative to said supporting surface for driving said workpiece holder through said workstation with components of motion in the directions X and Y, said shaft being rotatable about its axis with respect to said member, a control arm secured to said shaft for rotating said shaft about its said axis, a second cam extending generally along the route travelled by said carriage, said second cam for controlling the angular position of said control arm with respect to the axis of said shaft for producing rotational movement of said shaft about its said axis and thereby imparting rotational movement ($\theta$) to said workpiece holder about the axis of said shaft and means for raising and lowering said workpiece holder relative to said supporting surface for engaging said workpiece prior to manipulation thereof and for disengaging said workpiece following manipulation, by virtue of which the workpiece engaged by said workpiece holder and sliding upon said supporting surface is manipulated through said workstation with X and Y components of motion and rotational movement $\theta$ causing a predetermined desired path across the workpiece to be presented to said workpoint with every point along said path passing in sequence through said workpoint.

8. Manipulation apparatus for guiding a workpiece through a workstation containing a workpoint for producing components of motion and angular movement of the workpiece relative to said workpoint for causing a predetermined path across said workpiece to be presented to said workpoint and to be moved relative to said workpoint so that every point along said path passes through said workpoint in sequence, said manipulation apparatus comprising;

a workpiece supporting surface upon which the workpiece is readily slidable, a movable workpiece holder for engaging said workpiece in a strong frictional grip thereupon, a movable carriage, drive means for moving said carriage for producing a first component of motion in a first coordinate direction (X), a movable member constrained to move with said carriage, said movable member being free to move relative to said carriage with a second component of motion in a second coordinate direction (Y), a first cam defining a cam surface extending generally along the route travelled by said carriage, said first cam controlling said movable member for moving said member in the Y direction relative to said carriage as said carriage and said member progress in the X direction thereby imparting to said movable member components of motion in both of the directions X and Y, said movable member includes a cam follower and spring means coupled to said movable member and said carriage for urging said movable member toward said cam surface for following said surface and for moving said member in the Y direction as said carriage and said movable member progress in the X direction, a shaft extending perpendicular to said supporting surface, said shaft being secured to said workpiece holder for driving said holder, said shaft being constrained for moving with said movable member thereby imparting to the axis of said shaft components of motion in the directions X and Y relative to said supporting surface for driving said workpiece holder through said workstation with components of motion in the directions X and Y, said shaft being rotatable about its axis with respect to said member, said shaft being journaled in bearing means carried by said member, a control arm secured to said shaft for rotating said shaft about its said axis, a second cam including a cam track extending generally along the route travelled by said carriage, said second cam for controlling the angular position of said control arm with respect to the axis of said shaft for producing rotational movement of said shaft about its said axis and thereby imparting rotational movement ($\theta$) to said workpiece holder about the axis of said shaft, said control arm includes a cam follower element secured thereto at a point spaced from said axis of said shaft, said cam follower element engaging and following along said cam track for controlling the angular position of said control arm thereby controlling the rotational movement $\theta$ of said workpiece holder, and means for raising and lowering said workpiece holder relative to said supporting surface for engaging said workpiece prior to manipulation thereof and for disengaging said workpiece following manipulation, by virtue of which the workpiece engaged by said workpiece holder and sliding upon said supporting surface is manipulated through said workstation with X and Y components of motion and rotational movement $\theta$ causing a predetermined desired path across the workpiece to be presented to said workpoint with every point along said path passing in sequence through said workpoint.

9. Manipulation apparatus for guiding a workpiece through a workstation containing a workpoint for producing components of motion and angular movement of the workpiece relative to said workpoint for causing a predetermined path across said workpiece to be presented to said workpoint and to be moved relative to said workpoint so that every point along said path passes through said workpoint in sequence, said manipulation apparatus comprising;

a workpiece supporting surface upon which the workpiece is readily slidable, a movable workpiece holder for engaging said workpiece in a strong frictional grip thereupon, a movable carriage, drive means for moving said carriage for producing a first component of motion in a first coordinate direction (X), a movable member constrained to move with said carriage, said movable member being free to move relative to said carriage with a second component of motion in a second coordinate direction (Y), said movable member being an arm connected at a pivot to said carriage for enabling said arm to swing relative to said carriage with a component of motion in the X direction, a first cam extending generally along the route travelled by said carriage, said first cam controlling said movable member for moving said member in the Y direction relative to said carriage as said carriage and said member progress in the X direction thereby imparting to said movable member components of motion in both of the directions X and Y, a shaft extending perpendicular to said supporting surface, said shaft being secured to said workpiece holder for driving said holder, said shaft being constrained for moving with said movable member thereby imparting to the axis of said shaft components of motion in the directions X and Y relative to said supporting surface for driving said workpiece holder through said workstation with components of motion in the directions X and Y, said shaft being rotatable about its axis with respect to said member, said shaft journaled in bearing means located on said pivoted arm at a distance from said pivot, and said movable member further includes a cam follower roller mounted on said shaft, and spring means coupled between said arm and said carriage for urging said cam follower roller into engagement with said first cam for following said cam surface and for moving said pivoted arm in the Y direction as said carriage and said arm progress in the X direction, a control arm secured to said shaft for rotating said shaft about its said axis, a second cam extending generally along the route travelled by said carriage, said second cam for controlling the angular position of said control arm with respect to the axis of said shaft for producing rotational movement of said shaft about its said axis and thereby imparting rotational movement ($\theta$) to said workpiece holder about the axis of said shaft and means for raising and lowering said workpiece holder relative to said supporting surface for engaging said workpiece prior to manipulation thereof and for disengaging said workpiece following manipulation, by virtue of which the workpiece engaged by said workpiece holder and sliding upon said supporting surface is manipulated through said workstation with X and Y components of motion and rotational movement $\theta$ causing a predetermined desired path across the workpiece to be presented to said workpoint with every point along said path passing in sequence through said workpoint.

10. Manipulation apparatus for driving a workpiece through a workstation containing a workpoint to produce components of motion and angular movement of the workpiece relative to said workpoint for moving said workpiece through said workpoint so that a predetermined desired path across said workpiece passes through said workpoint and every point along said path passes in sequence through said workpoint, said manipulation apparatus including;

a work-supporting table having a low friction surface, a movable workpiece holder adapted to engage the upper surface of a workpiece resting on said low friction surface with a high friction engaging grip for driving said workpiece along said surface, a guide rod extending in a first coordinate direction (X) relative to said low friction surface, a carriage movable along said guide rod, drive means for moving said carriage along said guide rod for producing a component of motion in said first coordinate direction X, an arm, pivot means connecting said arm to said carriage for swinging about said carriage in a second coordinate direction (Y) relative to said low friction surface, a shaft extending perpendicular to said low friction surface, said shaft being secured to said workpiece holder for driving said holder, bearing means on said arm and spaced from said pivot means, said shaft being rotatably mounted in said bearing means, a first cam surface extending generally along in the vicinity of said rod, a first cam follower carried by said arm and spaced from said pivot means for controlling movement of said arm in the Y coordinate direction, said first cam follower cooperating with said first cam surface for driving said arm in the Y coordinate direction as said carriage moves in the X coordinate direction, a control lever secured to said shaft for rotating said shaft about its axis, a second cam surface extending generally along in the vicinity of said rod, a second cam follower on said lever cooperating with said second cam surface for turning said lever for producing rotational movement ($\theta$) of said shaft about its axis and of said workpiece holder about the axis of said shaft and means for raising and lowering said shaft for lowering said workpiece holder onto the said upper surface of said workpiece prior to manipulation thereof and for raising said workpiece holder off of said workpiece following manipulation, whereby the workpiece is engaged by said holder and is driven along said low friction surface in sliding relationship with X and Y coordinate movement and rotational movement $\theta$ causing a predetermined desired path across said workpiece to be presented to said workpoint in the workstation with every point along said path passing in sequence through said workpoint.

11. A system for handling a plurality of workpieces simultaneously for manipulating each one in turn through a workstation containing a workpoint for causing a predetermined desired path across said workpiece to be presented to said workpoint said apparatus comprising:

a low friction surface across which said workpiece is slidable, infeed means adapted to engage a first workpiece for feeding said first workpiece to a predetermined position in said workstation, a workpiece holder adapted to engage a second workpiece in said predetermined position for manipulating said second workpiece, outfeed means adapted to engage a third workpiece after release thereof by said workpiece holder for removing said third workpiece from said workstation, a carriage movable in a first coordinate direction (X) relative to said surface, means for driving said carriage for producing a first component of motion in said first coordinate direction X, a movable member coupled to said carriage constrained for moving with said carriage in said first coordinate direction X and free for moving in a second coordinate direction (Y) relative to said surface, means for moving said movable member in said second coordinate direction Y in cooperation with movemeans of said movable member in said first coordinate direction X, a shaft coupled to said movable member constrained for moving with said movable member in said first coordinate direction X and said second coordinate direction Y and free for imparting to said workpiece holder movement in said first coordinate direction (X) and said second coordinate direction (Y) and a rotational coordinate ($\theta$), means for moving said shaft in said rotational coordinate $\theta$ in cooperation with movement of said movable member in said first coordinate direction X and said second coordinate direction Y and means for engaging said workpiece holder with said second workpiece in said predetermined position for imparting movement of said workpiece holder to said second workpiece for manipulating said workpiece through said workstation so that a predetermined desired path across said workpiece passes through said workpoint.

12. Manipulation apparatus for manipulating a sequence of workpieces through a workstation containing a workpoint to produce components of motion and angular movement of the respective workpieces relative to said workpoint causing a predetermined desired curved path on the workpieces to be presented to said workpoint and causing the workpiece to be moved relative to said workpoint such that every point along said curved path passes in sequence through said workpoint, said manipulation apparatus comprising;

a work supporting surface upon which the sequence of workpieces are readily slidable, a movable workpiece holder for engaging a surface of a workpiece with a high friction grip, a movable carriage, drive means for moving said carriage to produce a first component of motion in a first coordinate direction (X), a movable member constrained to move with said carriage, said movable member being free to move relative to said carriage with a second component of motion in a second coordinate direction (Y), a first cam extending generally along the route travelled by said carriage, said first cam controlling said member for moving said member in the Y direction relative to said carriage as said carriage progresses in the X direction, thereby imparting to said member components of motion in both of the directions X and Y, a shaft secured to said workpiece holder for driving said holder, said shaft being constrained to move with said member, thereby imparting to the axis of said shaft components of motion in both of the directions X and Y relative to said supporting surface for driving said holder through the workstation with components of motion in both of the directions X and Y, said shaft being rotatable about its axis with respect to said member, control means coupled to said shaft for producing angular movement of said shaft about its axis for imparting angular movement to said holder, elevator means for lowering and raising said carriage relative to said supporting surface for engaging and releasing the successive workpieces, infeed means adapted for engaging a surface of the next workpiece of the sequence with a high friction grip for feeding the next workpiece into the workstation preparatory for engagement by said holder, outfeed means adapted for engaging a surface of the previous workpiece of the sequence with a high friction grip for feeding the previous workpiece out of the workstation after release by said holder, and means coupling said infeed means and said outfeed means to said carriage for moving synchronously with said carriage in said first coordinate direction (X), and for raising and lowering said infeed and outfeed means with said carriage with respect to said supporting surface.

13. Manipulation apparatus for manipulating a sequence of workpieces through a workstation as claimed in claim 12 in which said elevator means includes, a movable frame adapted to be lowered and raised, a guide rod carried by said frame and extending in said first coordinate direction (X), said carriage being slidable back and forth along said guide rod in the X direction, said carriage including rod elements extending in opposite directions therefrom, said rod elements being connected to said infeed means and to said outfeed means for synchronously moving said infeed and outfeed means with said carriage.

14. Manipulation apparatus for manipulating a sequence of workpieces through a workstation as claimed in claim 13 and adapted to perform the same cycle of operations with respect to each respective workpiece of the sequence and in which said drive means includes, means for driving said carriage in the forward direction and the reverse direction of said first coordinate direction and said carriage is moved to an initial position along said guide rod prior to engagement of the workpiece, said said elevator means includes means for lowering said carriage when said carriage is in its initial position for simultaneously engaging three workpieces, sequentially positioned, and means for raising said carriage after completion of manipulation of a workpiece by said holder, whereby a workpiece is engaged by said outfeed means after having been released by said holder, after manipulation thereof, a workpiece is engaged by said holder after having been released by said infeed means prior to manipulation thereof, and the next workpiece is engaged by said infeed means preparatory to feeding into the workstation, said drive means moving said carriage and therefore, said holder and said infeed means and said outfeed means in said forward direction, whereby said outfeed means moves the previously manipulated workpiece away from the workstation while the holder manipulates a workpiece through the workstation relative to the workpoint and the infeed means moves the next workpiece to be manipulated through the workstation in preparation for manipulation thereof, said elevator means raising said movable frame following completion of manipulation of a workpiece, and said drive means returning said carriage in said reverse direction together with said holder and said infeed and outfeed means to said initial position while said movable frame is elevated.

References Cited

UNITED STATES PATENTS

| | | | |
|---|---|---|---|
| 3,383,107 | 5/1968 | Hegegaard | 271—68 |
| 795,150 | 7/1905 | Miller. | |
| 2,982,238 | 5/1961 | Fromm. | |
| 3,001,489 | 9/1961 | Bond et al. | |
| 3,072,081 | 1/1963 | Milligan et al. | |
| 3,170,423 | 2/1965 | Henebry | 112—102 XR |
| 3,121,878 | 2/1964 | Wilder et al. | 112—2 XR |
| 3,351,032 | 11/1967 | Junkins. | |
| 3,358,626 | 12/1967 | Bryan. | |

FOREIGN PATENTS

| | | |
|---|---|---|
| 1,063,001 | 3/1967 | Great Britain. |

JAMES R. BOLER, Primary Examiner